US005121552A

United States Patent [19]

Cimador

[11] Patent Number: 5,121,552

[45] Date of Patent: Jun. 16, 1992

[54] DESIGN APPARATUS

[76] Inventor: Fausto R. Cimador, 1015 Second Dr., Greenport, N.Y. 11944

[21] Appl. No.: 701,690

[22] Filed: May 14, 1991

[51] Int. Cl.[5] .............. G01B 3/14

[52] U.S. Cl. .............. 33/563; 33/41.4; 33/1 B

[58] Field of Search .............. 33/562, 563, 565, 41.1, 33/41.4, 41.5, 41.6, 1 B, 1 G, 1 AA; 434/85, 87, 88, 96

[56] References Cited

U.S. PATENT DOCUMENTS

| | | | |
|---|---|---|---|
| 243,255 | 6/1881 | Hepp | 33/41.1 |
| 577,875 | 3/1897 | Neumann | 33/41.4 |
| 629,078 | 7/1899 | Holz | 33/474 |
| 1,593,353 | 7/1926 | Pollock | 33/564 |

*Primary Examiner*—Harry N. Haroian
*Attorney, Agent, or Firm*—Bauer & Schaffer

[57] ABSTRACT

A drawing kit is provided comprising a drawing pad, a plurality of transparent geometric shaped templates, and a double pencil holder. The pages of the pad have intersecting perpendicular lines and the templates have orthogonally intersecting indicia so that the templates may successively be selected and their indicia intersections aligned with line intersections on the drawing pad, and the outline of the template traced onto the pad so as to create more line intersections on the pad, and the successive process repeated to generate composite geometric designs on the pad. The double pencil holder has a pair of substantially parallel bores therethrough which allow pencils to be force-fitted therein securely enough to resist dislodgement from normal drawing forces. When the holder is kept at a constant angle with both pencil points on the paper, an image or portion thereof drawn with one of the pencils will be duplicated by the second pencil in a position slightly offset from the first image, the second image being useable to give an effect of depth to the first image. The double pencil holder is used to trace portions of the templates in the above procedure so that composite complex geometric designs having three-dimensional appearances may be created.

7 Claims, 6 Drawing Sheets

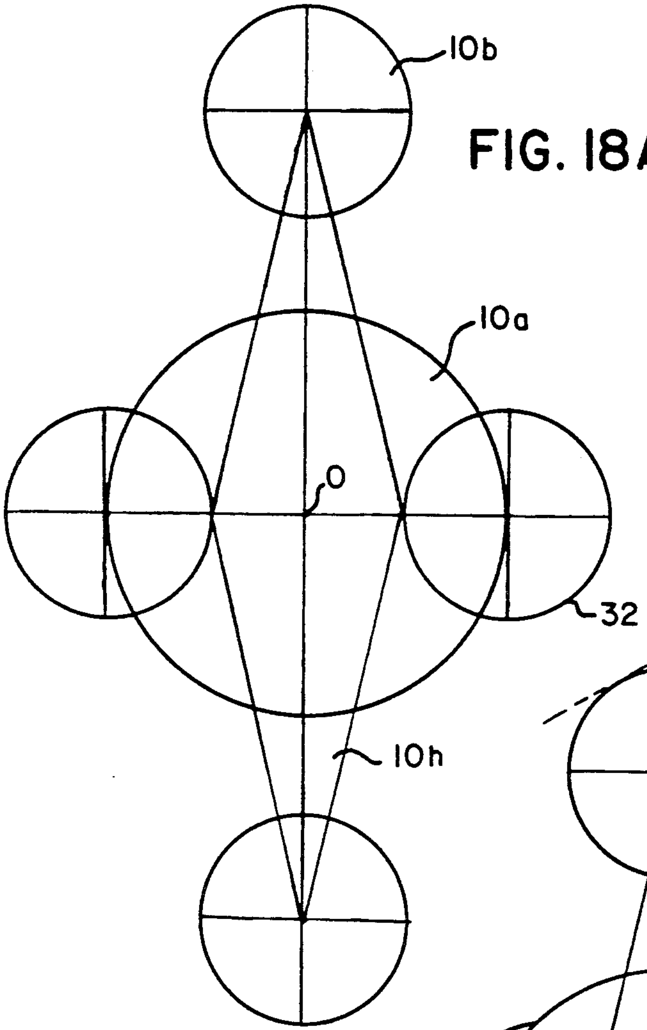
FIG. 18A
FIG. 18B
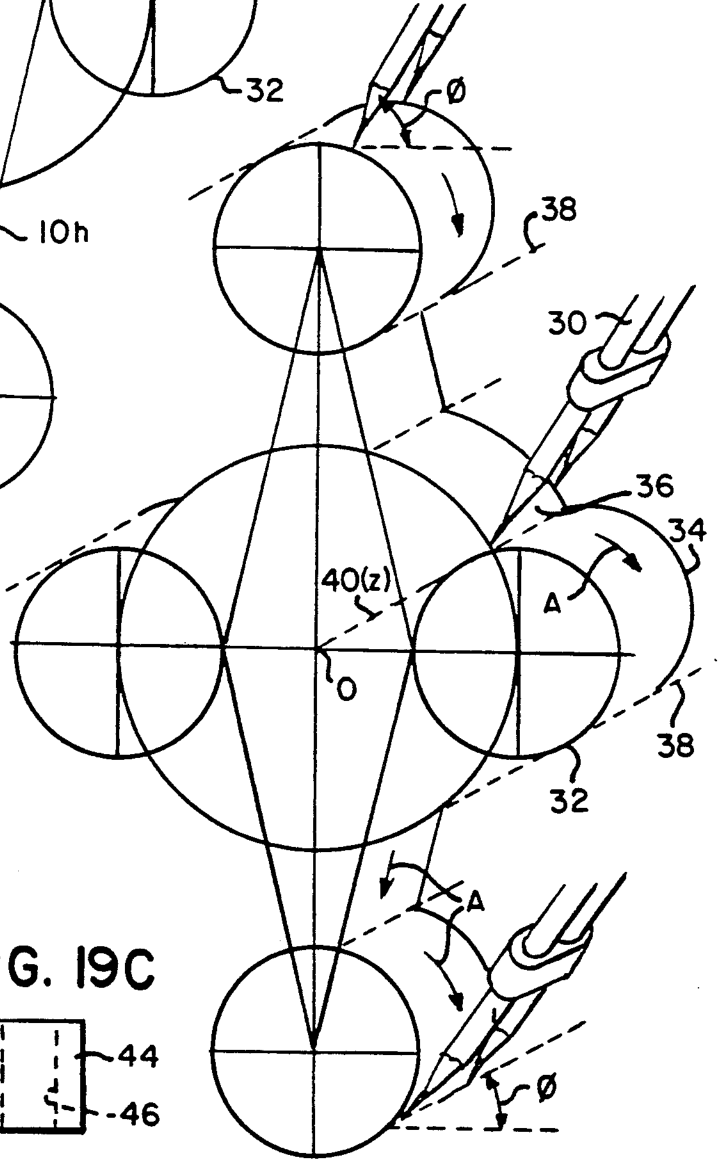
FIG. 19A
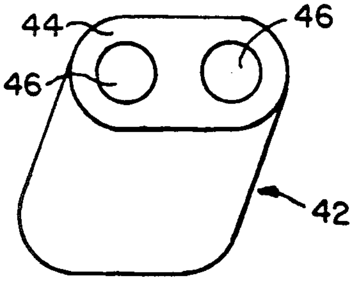
FIG. 19B
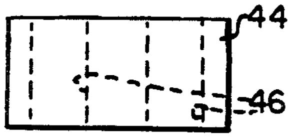
FIG. 19C

DESIGN APPARATUS

FIELD OF THE INVENTION

The present invention relates to drawing devices and, more particularly, to apparatus for drawing composite geometric designs having three-dimensional appearances.

BACKGROUND OF THE INVENTION

Drawing kits with templates are well known. They are used by persons of all ages for self-expression, entertainment, graphic design, and education of artistic and geometric principles. Such kits are often given to children to develop perception, coordination, imagination, and motor activity skills. Since drawing is believed to have positive therapeutic benefits, drawings kits are often used by the handicapped and incapacitated. Art students use such kits to study shape, symmetry, balance, spatial relationships, and the like.

In general, templates which are easy to use have the disadvantage of being unable to generate composite or complex geometric designs, and the user can become quickly bored. In particular, the known templates are poorly suited to generating designs having a three-dimensional appearances.

It is an object of the present invention to provide a template type drawing apparatus which can be used to generate complex and composite geometric designs.

It is another object of the present invention to provide a template type drawing apparatus useful for the development of three-dimensional perception, coordination, imagination, and motor skills.

It is still another object of the present invention to provide a drawing kit which includes an apparatus which enables the easy generation of patterns have three dimensional appearances.

Other objects and advantages of the instant invention will become obvious to those of skill in the art upon contemplation of the disclosure herein.

SUMMARY

According to the present invention, a drawing kit is provided comprising a plurality of transparent geometric templates having orthogonally oriented indicia and a drawing pad having one or more pairs of perpendicularly intersecting guide lines thereon so that said templates orthogonal indicia may be aligned with the guide lines on said drawing pad and traced successively so as to generate complex composite and orthogonally oriented geometric patterns. The kit further comprises a double pencil holder for securing two pencils or the like substantially parallel to one another. The double pencil holder comprises a body having a pair of spaced parallel bores therethrough, each bore being of sufficient dimension to allow the interference fitting of a pencil therein. When the templates are traced with a pencil in the holder and the holder orientation is held constant, the other pencil will generate a secondary outline so as to give three-dimensional effect to the traced pattern.

BRIEF DESCRIPTION OF THE DRAWINGS

FIGS. 18A and 18B are illustrations showing the creation of the same design in two and three dimensions, respectively;

FIGS. 19A, 19B, and 19C are perspective, side, and end views, respectively, of a holder embodying the present invention;

DETAILED DESCRIPTION OF THE PREFERRED EMBODIMENT

Figure 1:
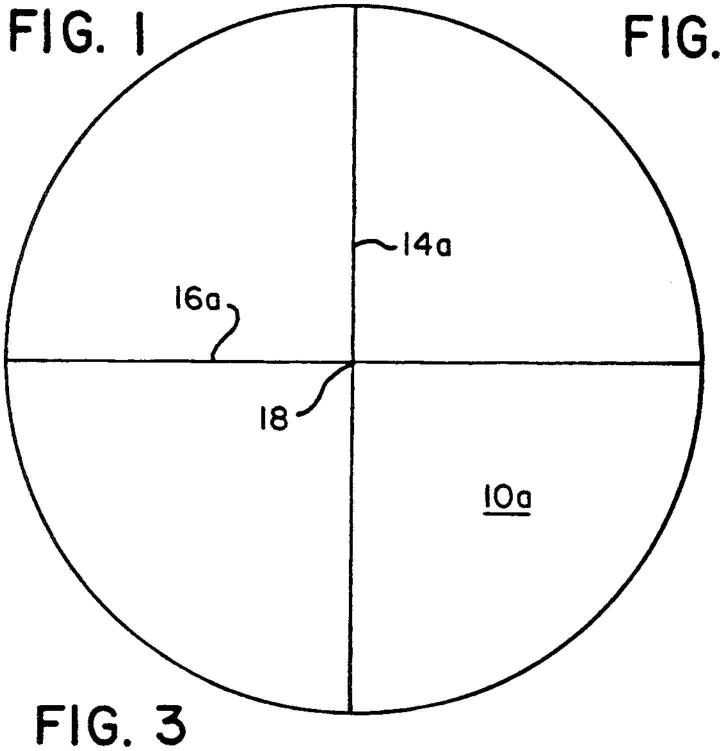
FIGS. 1-8 are illustrations of geometric templates of the type embodying the present invention.
Figure 2:
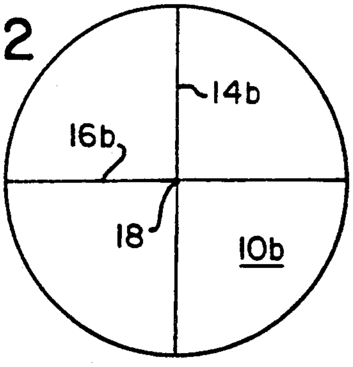
Figure 4:
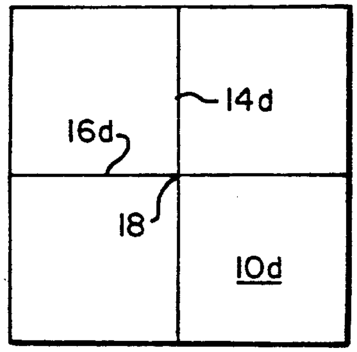
Figure 3:
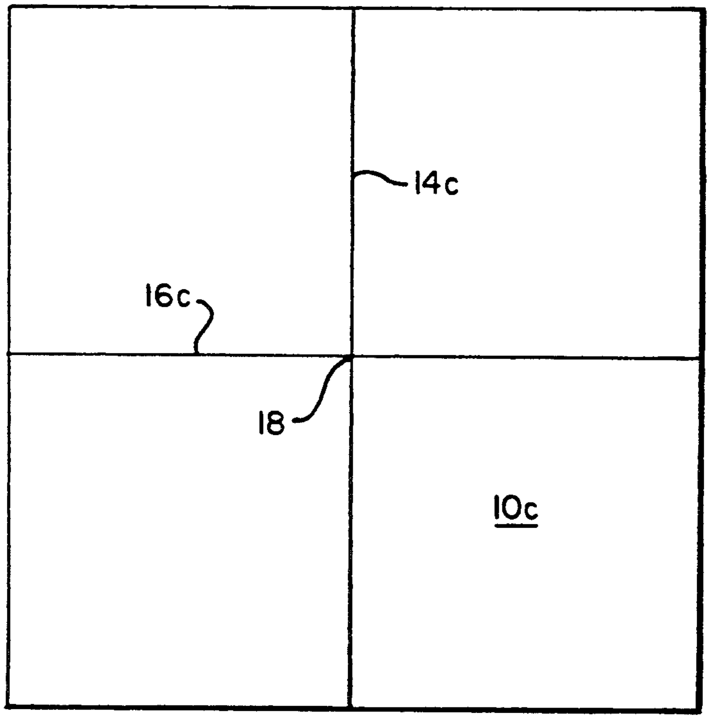
Figure 6:
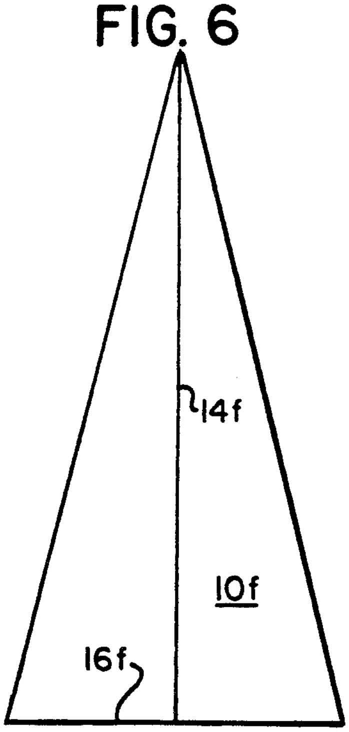
Figure 5:
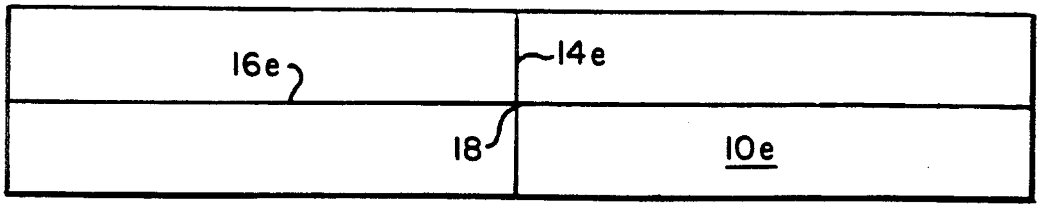
Figure 7:
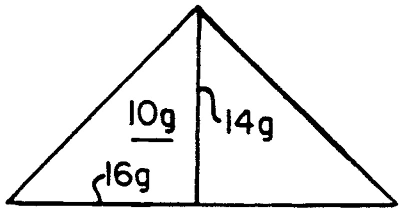
Figure 8:
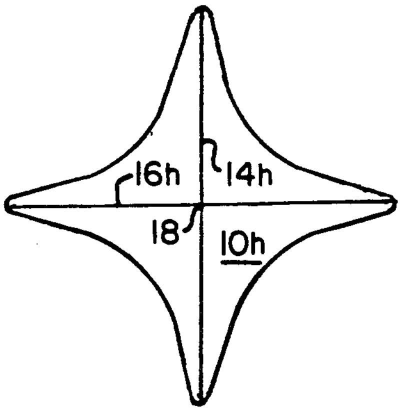

The present invention combines the use of a plurality of geometrically shaped templates 10 (FIGS. 1 through 8) and a drawing sheet 12 (FIG. 9), preferably package as a result. By selection, either randomly or with predefined and predetermined forethought, even a small number of simple plane geometric shapes may produce an infinite number of complex designs.

As seen in FIGS. 1-8, each of the templates are flat, relatively thin, transparent members of simple plane geometric configurations preferably made of high density plastic material. The templates may be formed of any material provided they are transparent or at least translucent so that the line markings on drawing sheets are visible through them. The edges of the templates are, of course, smooth. Amongst the template are a large circle 10*a* (FIG. 1), a small circle 10*b* (FIG. 2), a large square 10*c* (FIG. 3), a small square 10*d* (FIG. 4), a rectangle 10*e* (FIG. 5), an elongated isosceles triangle 10*f* (FIG. 6), a short triangle 10*g* (FIG. 7), and a quadrilateral 10*h* (FIG. 8), the sides of which are concavely curved.

The shapes 10*a* through 10*h* shown in FIGS. 1-8 have been found to provide the user with a variety of combinations for making an infinite number of designs. Of course, other geometrically shaped transparent templates, including large and small circles, squares and triangles, a rectangle, and a star may be used. The geometric and dimensional possibilities for such templates are endless, without departing from the spirit or scope of the instant invention.

Integrally provided on each template 10*a* through 10*h* are a pair of orthogonally oriented lines (conformingly subletted to conform to the numeration of the template shown). The lines represent indicia for positioning the templates on the drawing sheet 12 shown in FIG. 9 and with relative respect to the other templates used in combination therewith. The indicia lines 14 and 16 are preferably permanently embossed in one surface of the template, although permanent marking by painting, inset of colored plastic stripping, or the like may be used. Where feasible the indicia lines 14 and 16 are located to intersect at a point 18 coincident geometric center of the template shape. Thus, in the circles 10*a* and 10*b*, the indicia represent normally intersecting diagonal lines; in the square and rectangles 10*c* through 10*e* the indicia represent lines bisecting the opposite parallel sides; and in the quadrilateral 10*h* the indicia extend between opposite apices or points. Otherwise, as in the triangles 10*e* and 10*f* the indicia may be formed by one side and by an altitude dropped from the opposite angle thereto. While the position or number of indicia lines may be selectively varied, one set is preferred and it is critical that such lines be kept in orthogonal relationship and fixed on the template so as to be clear and precise when applied to the drawing sheet 12.

Figure 9:
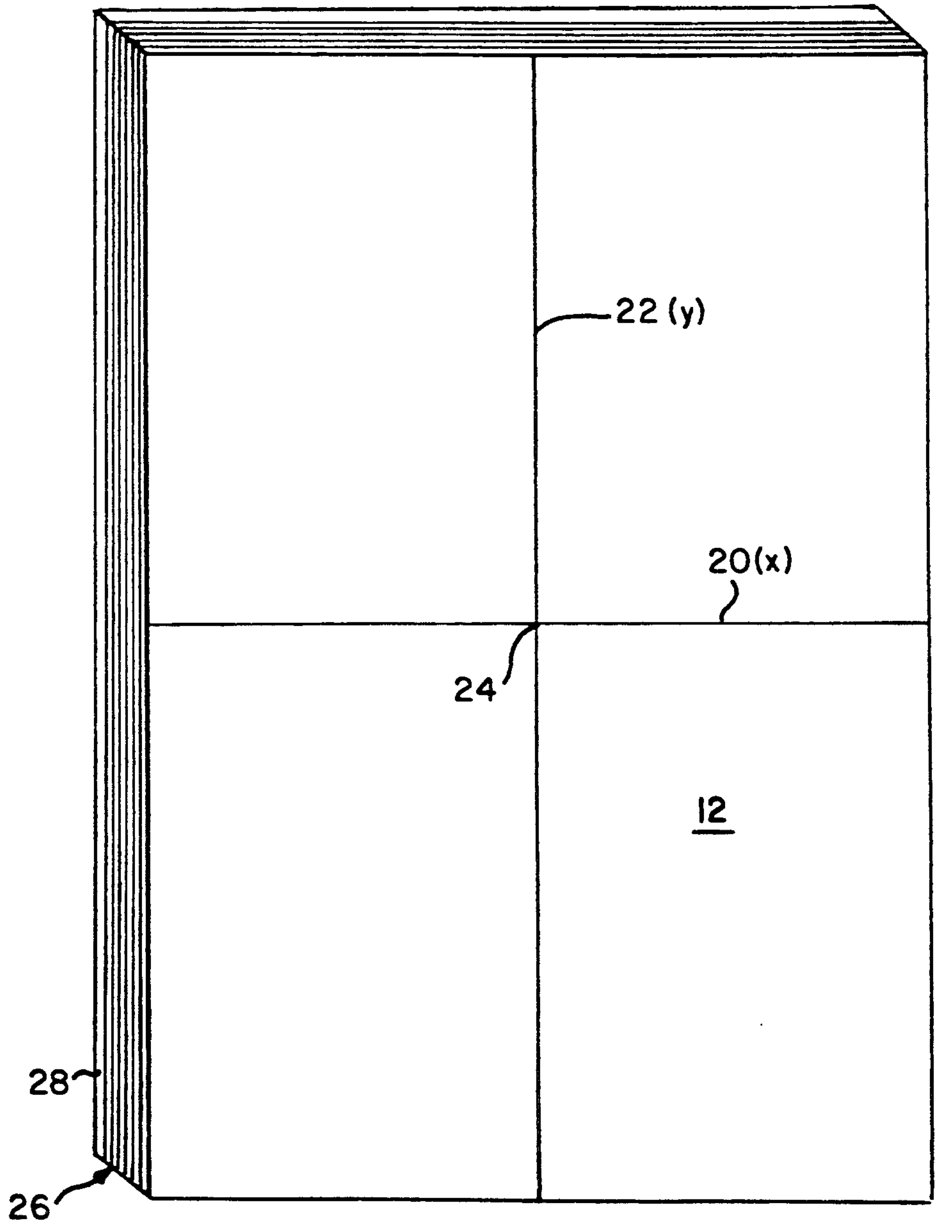
FIG. 9 is an illustration of the a sheet pad embodying the present invention.
Figure 10:
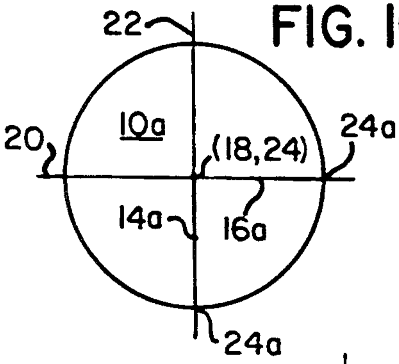
FIGS. 10-13 are illustrations showing the sequential creation in accord with the present invention.

The drawing sheet 12 (FIG. 2) is of conventional paper stock, sized as desired, which may be matte, calender, coated, colored, or otherwise untreated or treated. As seen in FIG. 9, the sheets are provided with a pair of orthogonally directed guide lines forming axes 20 and 22 (horizontal and vertical x-y) intersecting at or substantially at the geometric center 24 of the sheet. While sheets having more than one pair of intersecting axes or intersection at other than the geometric center are possible, it is considered preferable to provide only one pair of axes intersecting at the center since as will be apparent from the following description, almost every design can be obtained from this arrangement. A single pair of axes 20 and 22 is preferable for the additional reason that the ultimate design will be free of encumbering non-functional markings.

The drawing sheets 12 are preferably supplied in multiple sheets bound in a pad 26, having a heavy paper board back 28, which may act as an easel or other support or backing.

Figure 11:
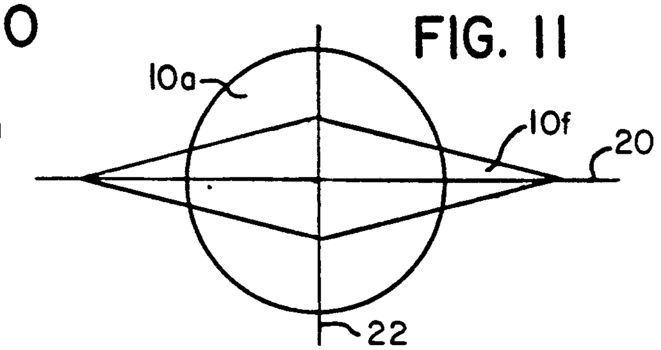
Figure 12:
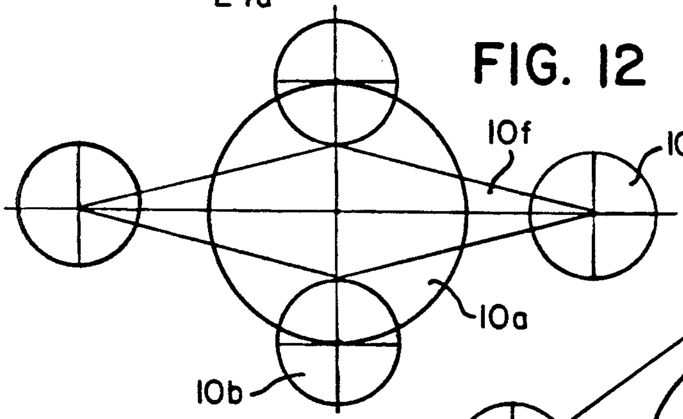
Figure 13:
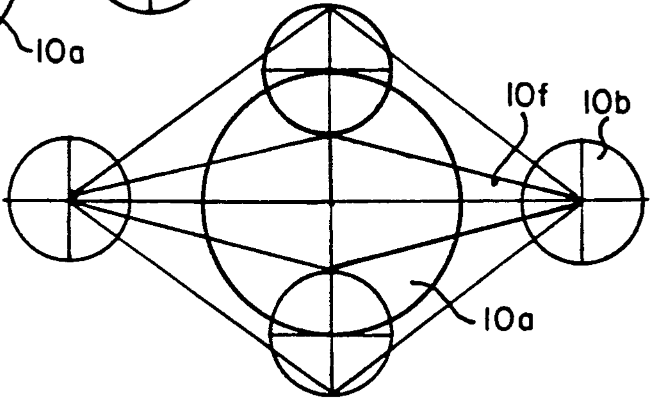
Figure 15:
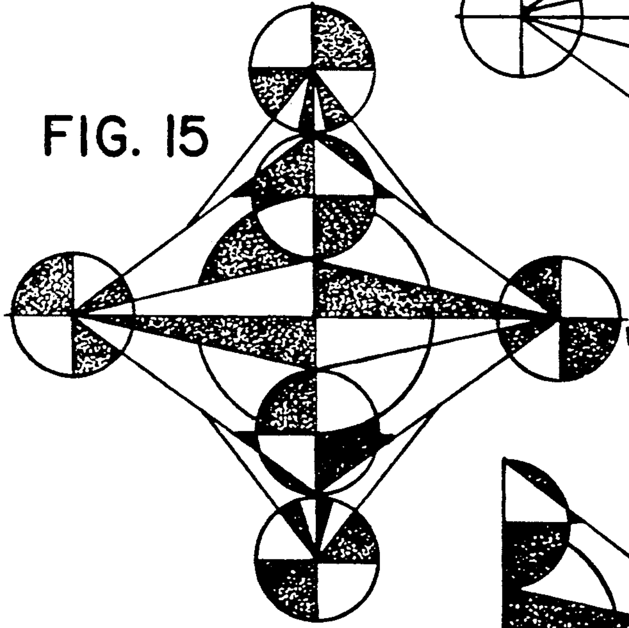
FIGS. 14-17 are illustrations of several complex designs made in accord with the present invention.
Figure 17:
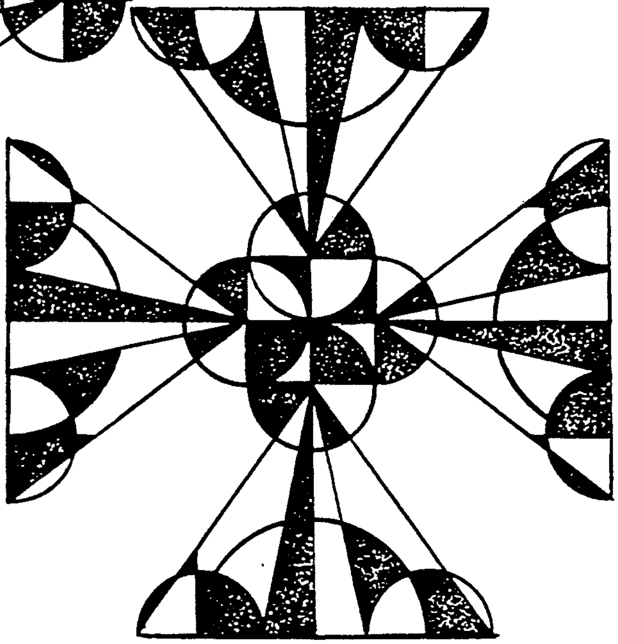
Figure 14:
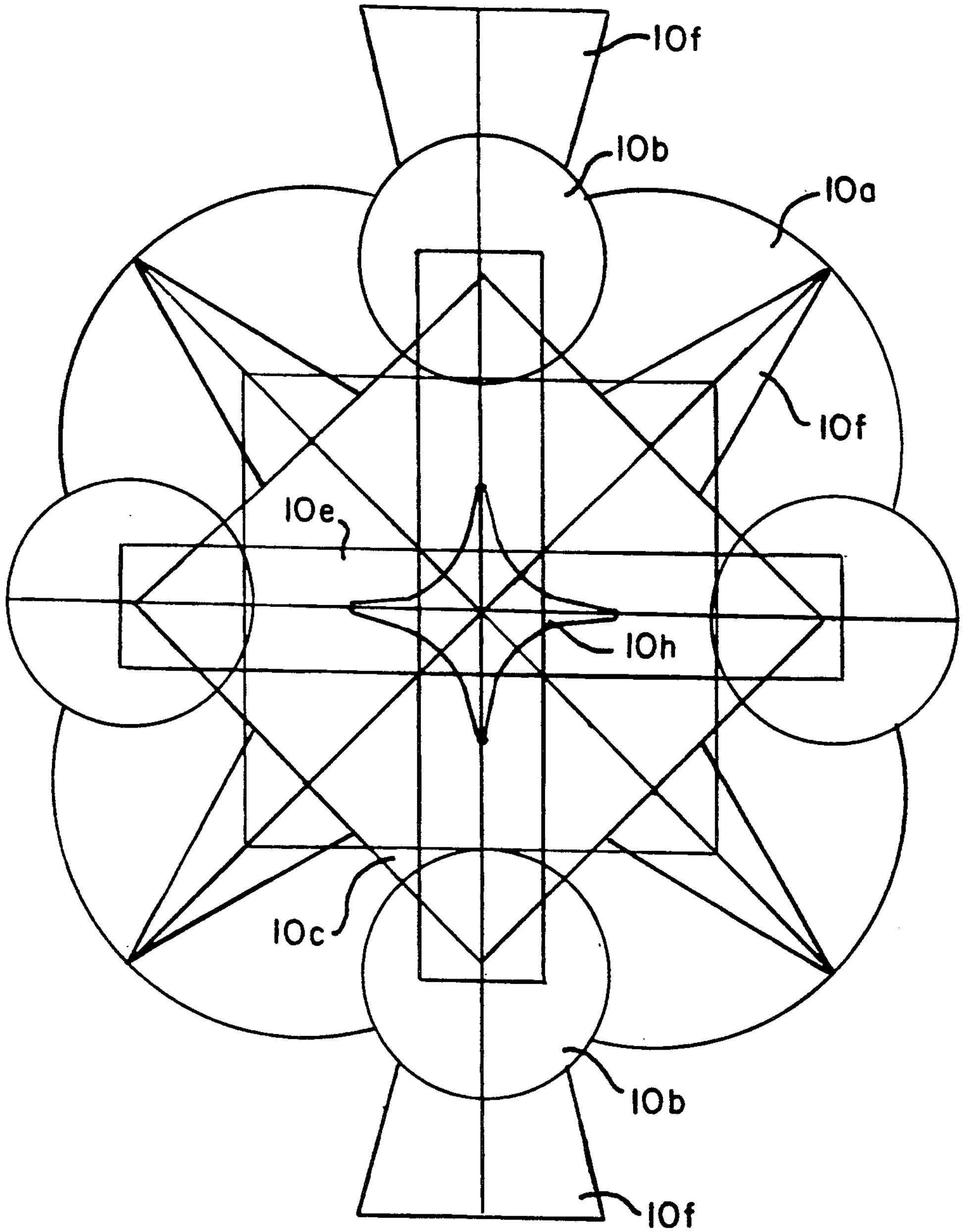
Figure 16:
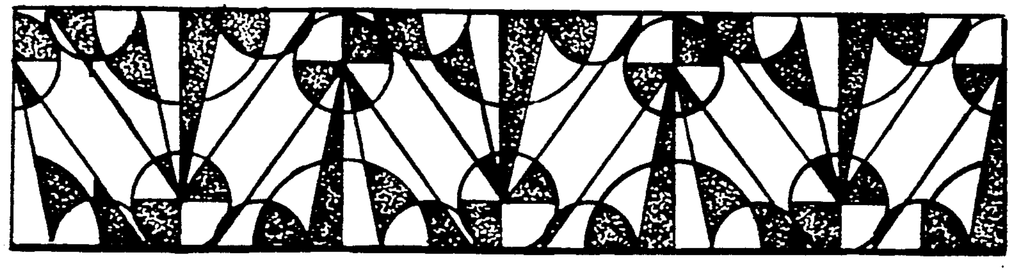

As seen in the sequence of FIGS. 10-13, a composite design of desired form is created by selecting a first template, here the larger circle 10*a*, and placing it on the sheet 12 so that the intersection 18*b* coincides with the intersection 24 on the sheet and the lines 14*a* and 16*a* overlie the perpendicular axes 20, 22. It is not critical at what angle the two sets of intersecting lines 14, 16 and axes 20, 22 are, in fact, arranged relative to each other, but by overlying the lines 14, 16 of the template with the axes 20, 22 of the paper, a more accurate alignment of each of the subsequent templates used to form the ultimate design will result. The outline of the selected template 10*b* is traced in whole or in part onto the pad. Thereafter, as seen in FIG. 11, the elongated isosceles triangle 10*f* is placed so that the altitude 14f coincides with the horizontal axis 20(x) and the base 16*f* coincides with the vertical axis 22(y). The smaller circles 10*b* may then be applied as shown in FIG. 12 and straight lines made to complete the design shown in FIG. 12. The tracing of the template onto the pad creates in addition to the line design other line intersections and nodal intersections 24*a* from which the user may successively continues drawing from selected templates, aligning the template indicia with a newly formed axes intersection 24*a*.

FIGS. 14-17 are examples of complex composite patterns which can be drawn according to this procedure, using each of the templates of FIGS. 1-8 in selected arrangement wherein the orthogonal lines of the templates coincide with the axes of sheet at the center insertion and/or at subsequently drawn nodal insections.

The designs may be completed in whole or in part by filling in various sections or portions of the design with color (paint or crayon) as desired by artist or draftsman. By artistic selection, repetition, and reorganization, the various templates can produce whole or partial shapes or shapes which are bisected and/or otherwise divided by the outline of other templates. No rulers, straight edges, or external guides are required or indeed are necessary to guide the templates and the straight lines can be drawn from the edges of the straight pieces.

Designs and figures of a three-dimensional nature may also be obtained by the use of the present invention. For example, in FIG. 18B the two dimensional design illustrated in FIG. 18A is connected to solid three-dimensional figure, using a pair of tandemly arrangely drawing instruments such as pencils 30. The instruments 30 are fixed in spaced parallel relationship so that one, when abutted against the peripheral edge of a template, traces the original outline 32 while creating a shadow outline 34 appearing in the third dimension. The criteria to be followed lies in maintaining the space 36 between the instruments constant and simultaneously maintaining the line between the instrument points in a movable axis 38 which itself is constantly parallel to a third guide axis 40 (in the Z direction) passing through the center intersection $\phi$ corresponding to the center 24 of the sheet of design and moving the pair instruments at the same angle and duration to the third axis. Further criteria lie in drawing the pencils across the paper in a uniform direction (see arrows A) and a constant angle O to the page.

The angle of the Z axis, with reference to the other axes, as well as the angle of the pencils, may be selected as desired to provide variation in the designs or to produce diffently appearing designs from the same templates. It will be apparent also that the three-dimensional design may be made by first drawing the two dimensional design from the templates as earlier described and thereafter retracing the original outline 32, utilizing the paired fixed instruments. In this case one instrument traces over the original outline while the second instrument produces its "shadow".

Figure 20:
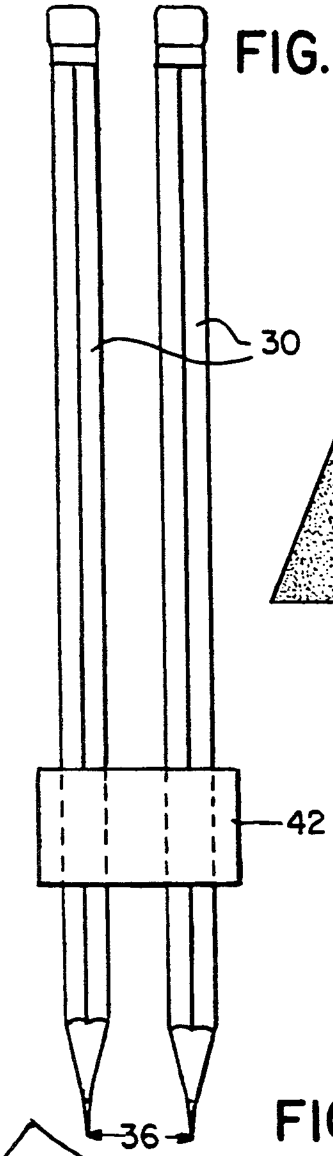
FIG. 20 is an elevational view of a pair of tandemly held pencils in the holder of FIG. 19.
Figure 21A:
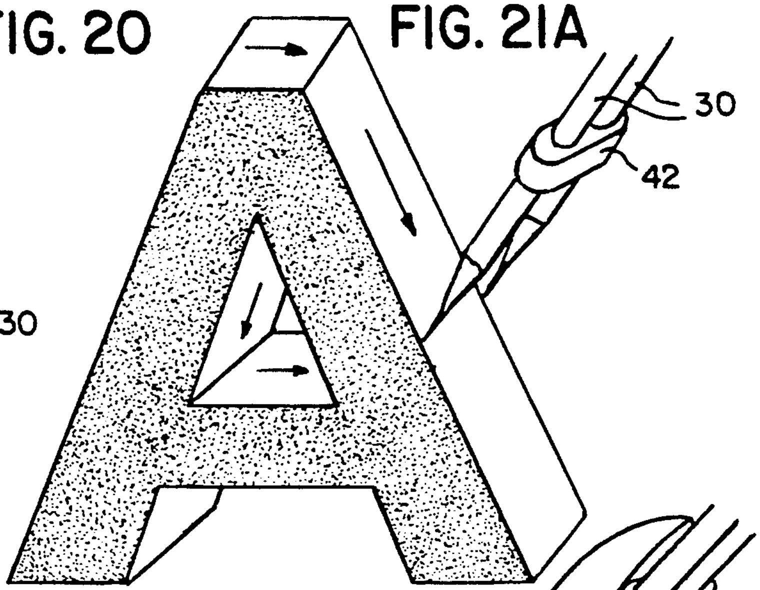
FIGS. 21A-21D are examples of lettering having three-dimensional effect as drawn using the double pencil holder of the instant invention.
Figure 21B:
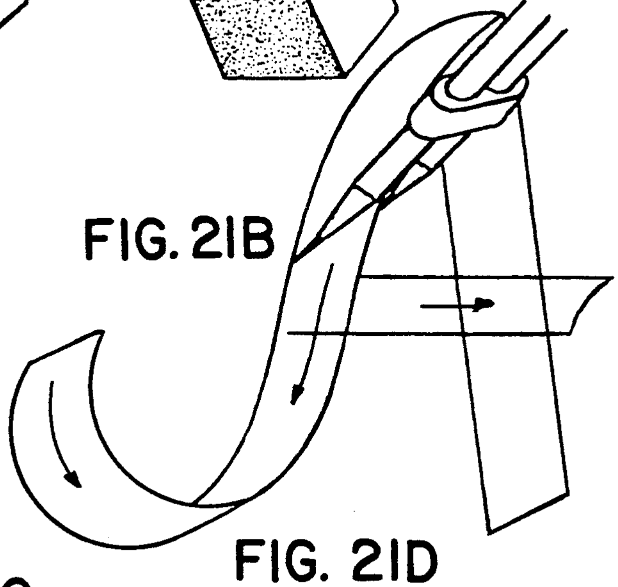
Figure 21C:
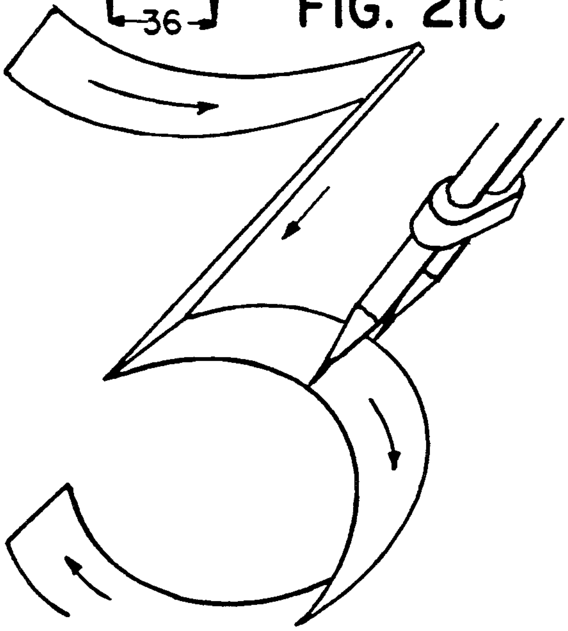
Figure 21D:

To facilitate the formation of three-dimensional designs the present invention provides a holder generally depicted by numeral 42 for the paired instruments 30. The holder 42, illustrated in FIGS. 19 and 20 comprises a body made of a substantially rigid material such as wood, plastic, or hard rubber, having a pair of parallel bores 46, the dimensions of which are such that the drawing instruments 30 such as the pencil are frictionally slideable therethrough. The pencils 30 are then held in interference fit so that normal drawing forces upon a pencil in the holder 42 will not cause either pencil to move therein. Obviously, other means for securing the instruments in the body such as set screws or the like may also be used. Preferably, the body is about ½ to 1 inch in height so that the length of the holes are sufficient to hold the instrument, while the holder itself does not interfere with its being manipulated by the user.

With two pencils installed into the double pencil holder, the holder is capable of being securely held at the constant angle necessary to trace the design on the pad. While one pencil in the holder draws an outline of the template, the second pencil will draw a secondary image slightly offset in position from the template outline.

It will be appreciated that the three-dimensional effect may be created using the double pencil holder without the above templates or pad, likewise by keeping the double pencil holder at a constant angle and drawing with both pencil points. Letters, either traced or free-hand, can be drawn by using this technique, as is seen in FIGS. 21A-21D. Shading selective portions to produce a three-dimensional effect to generate block-like, ribbon-like, and similar appearances can also be made.

While the above description contains many specificities, these should not be construed as limitations on the scope of the instant invention but rather as an exemplification of the preferred embodiment thereof. Accordingly, the scope of the instant invention should not be determined by the embodiment shown but rather by the claims appended hereto.

What is claimed is:

1. A drawing kit comprising a drawing sheet having at least one pair of intersecting perpendicular lines; and a plurality of transparent geometric shaped templates, each said template having orthogonally intersecting indicia thereon, so that the intersection of indicia on a selected one of said templates can be aligned with the intersection of the lines on the drawing sheet and the outline of said template traced onto the drawing sheet thereby creating more line intersections on the drawing sheet and the selection from said templates, alignment of said template indicia with selected intersections of the lines on said sheet and tracing of said templates onto said sheet repeated so as to enable the generation of complex composite geometric designs.

2. The drawing kit according to claim 1, including a holder for drawing with three-dimensional effect comprising a body having a pair of parallel bores therethrough, each bore being adapted to secure an instrument for drawing therein so that the drawing instrument will not move with respect to said body when normal drawing forces are exerted on the drawing instrument.

3. Apparatus for drawing comprising:

a) a drawing pad having one or more drawing pages, the pages thereof each having at least one pair of intersecting perpendicular lines;

b) a plurality of transparent geometric shaped templates, each said template having orthogonally intersecting indicia thereon; and c) an instrument holder comprising a body having a pair of substantially parallel bores therethrough, each bore being of dimension to permit the force fitting of an instrument for drawing therein so that the drawing instrument will not move with respect to said body when normal drawing forces are exerted on the drawing instrument; and so that when a pair of instruments for drawing are inserted in the bores of said instrument holder and said body is held at a substantially constant angle while engaging both of the instruments for drawing on the drawing page and an image or design or portion thereof is drawn with the first drawing instrument, the second drawing instrument will be caused to draw a duplicate image offset from the image or design or portion thereof drawn by the first drawing instrument, portions of the duplicate image are useable to give an effect of depth to the image drawn with the first drawing instrument; and so that the intersection of indicia on a selected one of said templates can be aligned with the intersection of the lines on the drawing page of said pad and the outline of said template traced onto the drawing page said pad, thereby creating more line intersections on the drawing page; and the selection from said templates, alignment of said template indicia with selected intersections of the lines on said pad, and tracing of said templates on said pad repeated so as to enable the generation of complex composite geometric designs; and so that selected portions of said templates may be traced using said instrument holder so as to enable the generation of complex composite geometric designs having an effect of depth.

4. The drawing kit according to claim 1, wherein said geometric templates are two-dimensional representations of circular, rectangular, triangular, stallar, and quadrilateral shapes.

5. The drawing kit according to claim 1, including a pad containing a plurality of sheets each sheet being removable from said pad.

6. A system for drawing comprising the steps of providing a drawing sheet having at least one pair of intersecting perpendicular lines and having a plurality of transparent geometric shaped templates, each said template having orthogonally intersecting indicia thereon; applying a selected one of said templates on said sheet so that the intersection of the indicia thereon is aligned with the intersection of the lines on the drawing sheet; tracing the outline of said template onto the drawing sheet to thereby create a figure having additional intersections; and thereafter selectively applying and tracing additional templates in alignment with selected ones of the intersections previously traced, said tracings being repeated so as to generate a complex composite geometric design.

7. The system according to claim 6, including the steps of providing a holder comprising a body having a pair of parallel bores therethrough and a drawing instrument secured in each bore; applying the instruments so held at a substantially constant angle and a constant relative distance from each other to said sheet; and tracing the selected template in duplicate image to form a three-dimensional effect.

* * * * *